(12) United States Patent
Muntz

(10) Patent No.: US 6,973,072 B1
(45) Date of Patent: Dec. 6, 2005

(54) HIGH PERFORMANCE PROTOCOL FOR AN INTERCONNECT SYSTEM OF AN INTERMEDIATE NETWORK NODE

(75) Inventor: Gary S. Muntz, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 916 days.

(21) Appl. No.: 09/791,062

(22) Filed: Feb. 22, 2001

(51) Int. Cl.[7] .............................................. H04L 12/28
(52) U.S. Cl. ........................ 370/351; 370/400; 370/419
(58) Field of Search ................................ 370/351, 352, 370/353, 354, 356, 359, 389, 392, 397, 399, 395.31, 400, 401, 419, 465, 474, 516, 517, 518, 519, 329, 412

(56) References Cited

U.S. PATENT DOCUMENTS

| | | | |
|---|---|---|---|
| 5,548,587 A | * | 8/1996 | Bailey et al. ............. 370/395.7 |
| 5,835,725 A | | 11/1998 | Chiang et al. |
| 5,884,043 A | | 3/1999 | Teplitsky |
| 5,991,817 A | | 11/1999 | Rowett et al. |
| 6,054,942 A | | 4/2000 | Stemmler |
| 6,163,543 A | | 12/2000 | Chin et al. |
| 6,208,649 B1 | | 3/2001 | Kloth |
| 6,339,595 B1 | | 1/2002 | Rekhter et al. |
| 6,434,115 B1 | * | 8/2002 | Schwartz et al. ........... 370/235 |
| 6,463,061 B1 | | 10/2002 | Rekhter et al. |
| 6,587,463 B1 | * | 7/2003 | Hebb et al. ................. 370/392 |
| 2002/0024970 A1 | * | 2/2002 | Amaral et al. .............. 370/468 |

OTHER PUBLICATIONS

U.S. Appl. No. 09/791,063, filed Feb. 22, 2001, Rachepalli et al.
U.S. Appl. No. 09/790,970, Federkow et al.
U.S. Appl. No. 09/790,826, Muntz et al.
U.S. Appl. No. 09/791,070, Federkow et al.
Cisco Systems, Inc. ; White Paper: Alternatives for High Bandwidth Connections Using Parallel T1/E1 Links; pp. 1-8.

* cited by examiner

Primary Examiner—Phirin Sam
(74) Attorney, Agent, or Firm—Cesari & McKenna, LLP

(57) ABSTRACT

An interconnect protocol enables encoding of packets for transmission over an interconnect system used to couple a plurality of line cards to at least one performance routing engine of an aggregation router. The protocol manifests as a unique encoding and encapsulation technique for data transmitted over point-to-point links of the interconnect system. The encapsulation technique includes an interconnect header which is attached to each packet. Framer logic is provided at a transmitter of the system to generate encoded frames from a stream of packet data for transmission over the links and at a receiver to recover the transmitted data from the frames.

27 Claims, 9 Drawing Sheets

HIGH PERFORMANCE PROTOCOL FOR AN INTERCONNECT SYSTEM OF AN INTERMEDIATE NETWORK NODE

CROSS-REFERENCE TO RELATED APPLICATIONS

The present invention is related to the following co-pending and commonly assigned U.S. Patent Applications:

U.S. patent application Ser. No. 09/790,970 titled, Apparatus and Technique for Conveying Per-Channel Flow Control Information to a Forwarding Engine of an Intermediate Network Node;

U.S. patent application Ser. No. 09/790,826 titled, Bound Mode Technique for Accommodating High-Bandwidth Data Flow within an Intermediate Network Node; and U.S. patent application Ser. No. 09/791,070 titled, Mechanism and Technique for Detecting and Containing a Clock Glitch within a Clocking Subsystem of an Intermediate Network Node, each of which was filed on even date herewith and incorporated by reference as though fully set forth herein.

FIELD OF THE INVENTION

The present invention relates to intermediate nodes of communications networks and, in particular, to a technique for efficiently transmitting data over an interconnect system of an intermediate node used in a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate node, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide highspeed connection to the Internet. To interconnect private networks that are geographically diverse, an organization may subscribe to one or more ISPs and couple each of its private networks to the ISPs equipment. Here, the router may be utilized to interconnect a plurality of private networks or subscribers to an IP "backbone" network. Routers typically operate at the network layer of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router, or "aggregator", is an access router configured to provide high quality of service (QoS) and guaranteed bandwidth for both data and voice traffic destined for the Internet. The aggregator also provides a high degree of security for such traffic. These functions are considered "high-touch" features that necessitate substantial processing of the traffic by the router.

More notably, the aggregator is configured to accommodate increased density by aggregating a large number of leased lines from ISP subscribers onto a few trunk lines coupled to an Internet backbone. Increased density has a number of advantages for an ISP, including conservation of floor space, simplified network management and improved statistical performance of the network. Real estate (i.e., floor space) in a POP is typically expensive and costs associated with floor space may be lowered by reducing the number of racks needed to terminate a large number of subscriber connections. Network management may be simplified by deploying a smaller number of larger routers. Moreover, larger numbers of interfaces on the access router improve the statistical performance of a network. Packet networks are usually designed to take advantage of statistical multiplexing, capitalizing on the fact that not all links are busy all of the time. The use of larger numbers of interfaces reduces the chances that a "fluke" burst of traffic from many sources at once will cause temporary network congestion.

In addition to deployment at a POP, the aggregator may be deployed in a telephone company central office. The large numbers of subscribers connected to input interface ports of the aggregator are typically small to medium sized businesses that conduct a substantial portion of their operations "on-line", e.g., over the Internet. Each of these subscribers may connect to the aggregator over a high reliability link connection that is typically leased from, e.g., a telephone company provider. The subscriber traffic received at the input interfaces is funneled onto at least one trunk interface. That is, the aggregator essentially functions as a large "fan-in" device wherein a plurality (e.g., thousands) of relatively low-speed subscriber input links is aggregated onto a single, highspeed output trunk to a backbone network of the Internet.

Broadly stated, each input link may comprise a T1 or T3 connection, whereas the output trunk interface connection may comprise an OC-12 connection. A T1 connection has a data rate of 1.5 megabits per seconds (Mbps) and there are preferably 28 T1s to each T3 connection; a T3 connection thus has an effective data rate of approximately 42 Mbps. On the other hand, the effective data rate of an OC-12 trunk interface connection is typically 622 Mbps. As noted, the aggregator receives a plurality of subscriber inputs (e.g., 1000 T1 lines) and aggregates them onto a single output trunk (e.g., an OC-12 link). However, not all T1 links are constantly in use and, through the use of statistical multiplexing, the number of input subscriber lines that can be disposed over a single output trunk at one time can be determined. For example, although the effective data input rate of 1000 T1 lines is greater than 1 gigabit per second (Gbps), the subset of T1 lines that is constantly in use (e.g., approximately 400 T1 lines) may be supported over a single 622 Mbps link (OC-12).

Examples of intermediate network device platforms that may be used as aggregation routers include the 7200 Series and 12000 Series systems available from Cisco Systems, Inc. The Cisco 7200 system embodies a centralized network processing engine architecture that utilizes a shared bus as its switching fabric. The Cisco 12000 gigabit switch router (GSR) system, on the other hand, is based on a high-speed distributed routing architecture that utilizes a crossbar switch fabric having point-to-point links as its switching core. The present invention is directed, in part, to an aggregation router having a centralized routing architecture coupled to a point-to-point switch fabric for servicing a plurality of subscriber input links.

The present invention is further directed a technique that enables a plurality of subscribers to efficiently interleave their packet data over a single internal link of the aggregation router. In addition, the present invention is directed to a technique that allows receiver circuitry within the aggregation router to uniquely identify each packet during a data recovery process. Moreover, the present invention is directed to a technique that limits bandwidth consumed by overhead when transmitting packets internally within the aggregation router.

SUMMARY OF THE INVENTION

The present invention comprises a protocol that enables encoding of packets for transmission over an interconnect system used to couple a plurality of line cards to at least one performance routing engine (PRE) of an intermediate network node, such as an aggregation router. The line cards include input cards having input ports coupled to subscribers and at least one trunk card configured to aggregate packets received from the subscriber inputs over at least one output port. The PRE performs packet forwarding and routing operations, along with quality of service functions for the packets received from each input line card over the interconnect system. To that end, the interconnect system comprises a plurality of high-speed unidirectional (i.e., point-to-point) links coupling the PRE to each line card.

In accordance with the invention, the novel interconnect protocol manifests as a unique encoding and encapsulation technique for data transmitted over the point-to-point links. Specifically, the protocol is directed to framer logic cooperatively coupled with both a transmitter to generate encoded frames from a stream of packet data (bytes) for transmission over the links and a receiver to recover the transmitted data bytes from the frames. An encoded frame preferably includes a plurality of start of packet (SOP) indicators (e.g., one every two bytes) such that a maximum delay to begin transmitting a packet over a point-to-point link is generally short, e.g., sixteen (16) bits, which substantially reduces latency associated with transmission of the packets. The encoded frame also minimizes wasted bandwidth between packets, e.g., to 4 bits on average, thereby maximizing throughput.

In addition, the protocol is directed to a unique encapsulation format of a packet for transmission over the interconnect system. Broadly stated, each interconnect packet is encapsulated with an interconnect header that comprises, inter alia, a channel number field and a length field, the latter of which is advantageously used to determine the end of a packet. Unlike prior systems that utilize end of packet (EOP) indicators to indicate the end of a packet, the novel protocol requires use of only the length field within the interconnect header to determine the end of a packet. The content of the length field indicates the length of the packet as it is transmitted over the link. The channel number field enables a substantial number (e.g., thousands) of different subscribers to efficiently interleave their packet data over a single point-to-point link, while allowing receiver circuitry to uniquely identify each packet during a data recovery process.

Use of the length field to determine the end of a packet is advantageous because EOP indicators tend consume substantial bandwidth and a goal of the novel protocol is to limit the overhead consumed within the interconnect bandwidth. Moreover, the novel encapsulation technique enables a substantial amount of bandwidth to be used for transferring data over a point-to-point link of the interconnect system. For example, ⅚ of the frame bandwidth is available for transferring data, while only ⅙ of the bandwidth is needed for control information directed to, e.g., flow control, flow bits, SOP indicators and error checking. dr

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
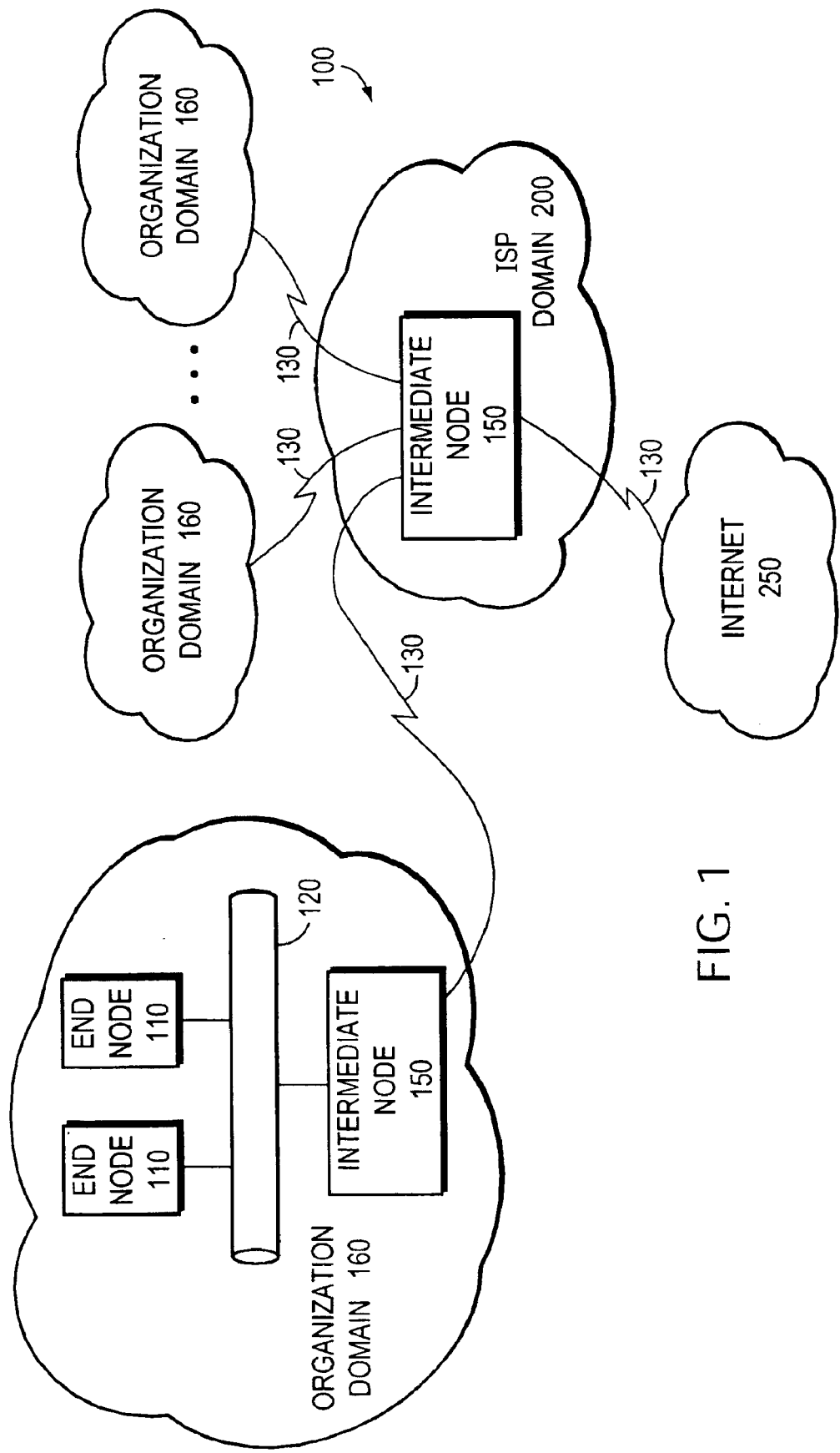
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/internet Protocol (TCP/IP). It should be noted that other techniques/protocols, such as the Hypertext Transfer Protocol (HTTP), may be advantageously used with the present invention.

Figure 2:
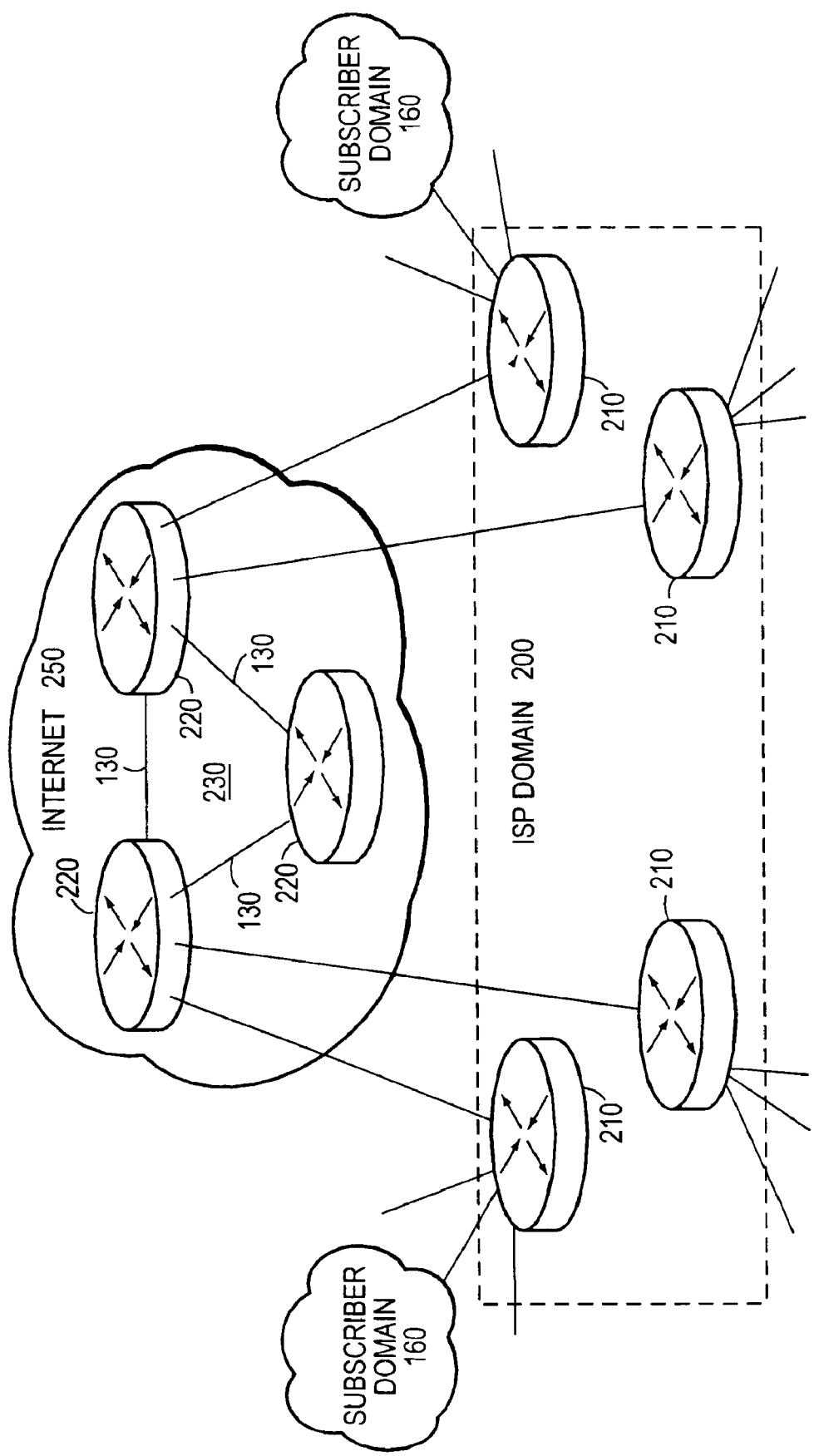
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, highcapacity, wide area connectivity to the Internet, represented herein as Internet cloud 250.

Figure 3:
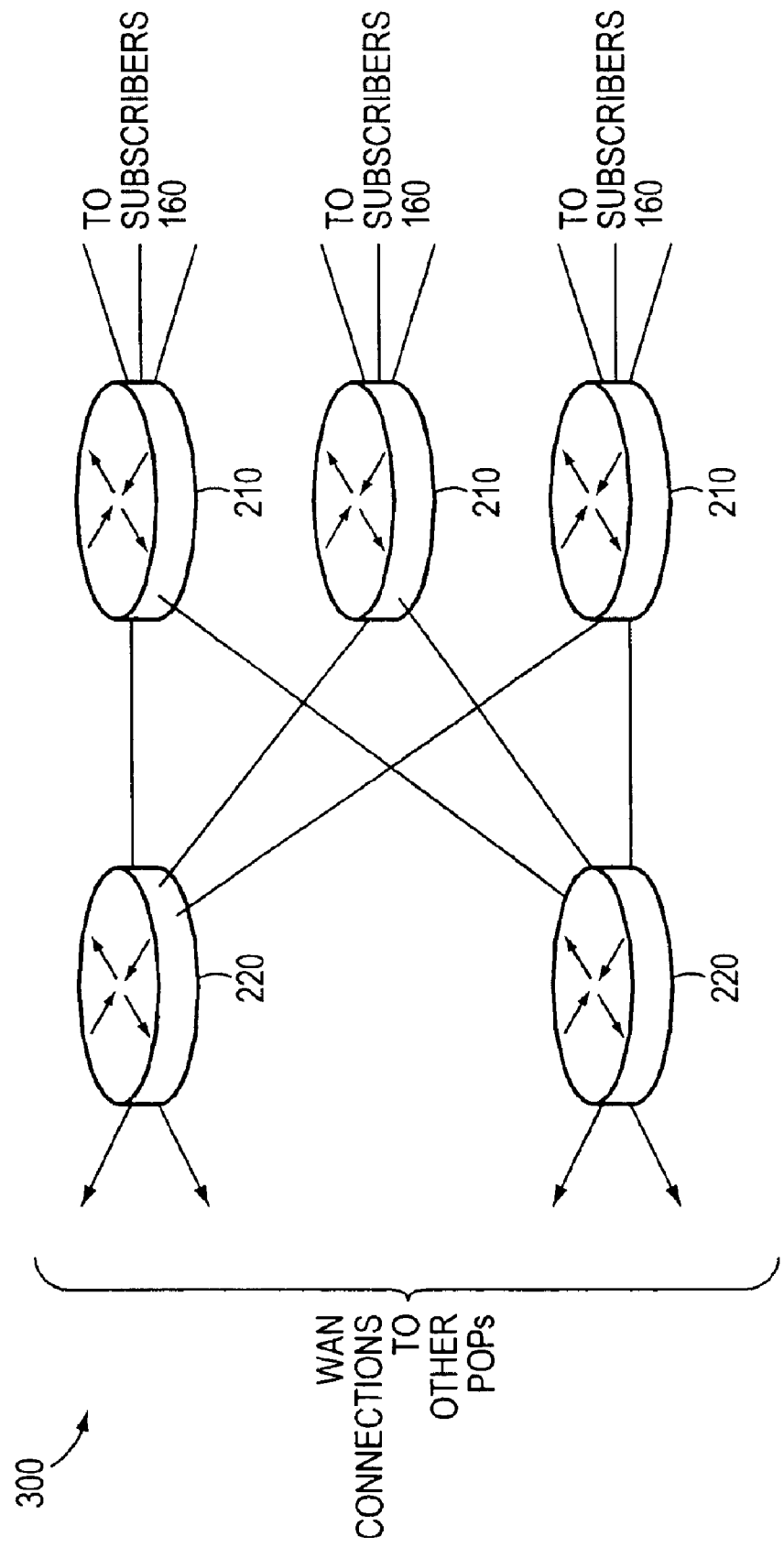
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

In general, the access router 210 serves as a "front line" for an ISP 200, connecting directly to routers on the subscribers' premises. However, there is usually a complex circuit-switched infrastructure that transports, e.g., a leased line signal a "last mile" between the subscriber premises and the POP 300. There are many ways of constructing the last-mile network; one technique for new installations is based on metropolitan-area fiber-optic ring technology. These fiber-optic network installations may be based on Synchronous Optical Network (SONET) or Synchronous Digital Hierarchy (SDH) standards. SONET/SDH technology is desirable in transport networks that provide leased line connectivity to subscriber routers because of the high capacity of fiber-optic cables and the high-density, industry-wide standard interface between network transport equipment and the equipment that uses the transported signals, such as aggregation routers.

Figure 4:
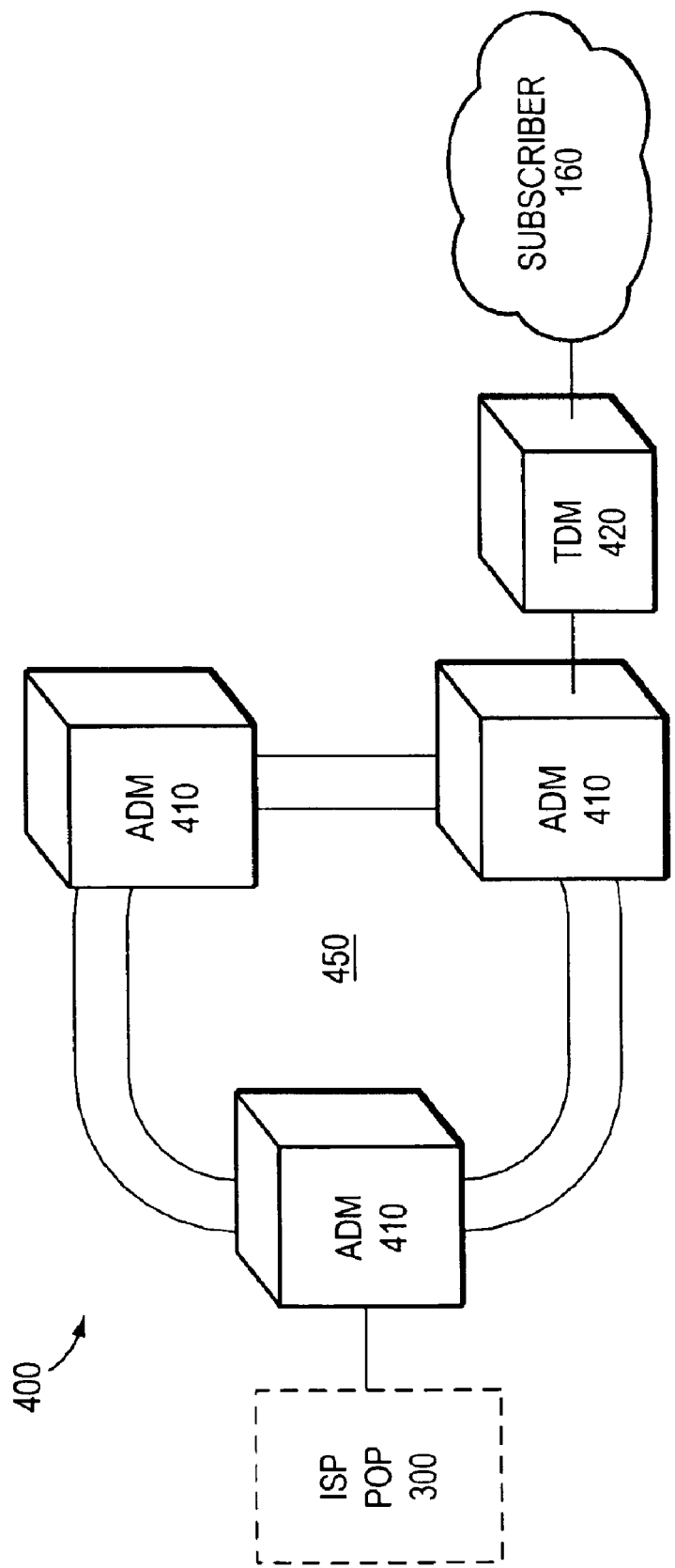
FIG. 4 is a schematic block diagram of a Synchronous Optical Network (SONET) metropolitan-area transport network that may be advantageously used with the present invention.

FIG. 4 is a schematic block diagram of a SONET metropolitan-area transport network 400 that may be advantageously used with the present invention. The SONET network 400 transports 1.544-Mbps DSI and 44.736-Mbps DS3 signals from a subscriber site 160 across a fiber-optic ring 450 to an ISP POP 300. To that end, the SONET network 400 comprises a TDM device 420 configured to multiplex a plurality of (e.g., 28) DS1 circuits to fill a DS3 circuit. In addition, the network 400 comprises a plurality of add drop multiplexers (ADMs 410) configured to "drop-off" either DS1 or DS3 circuits onto, e.g., an OC-48 SONET fiber.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 5:
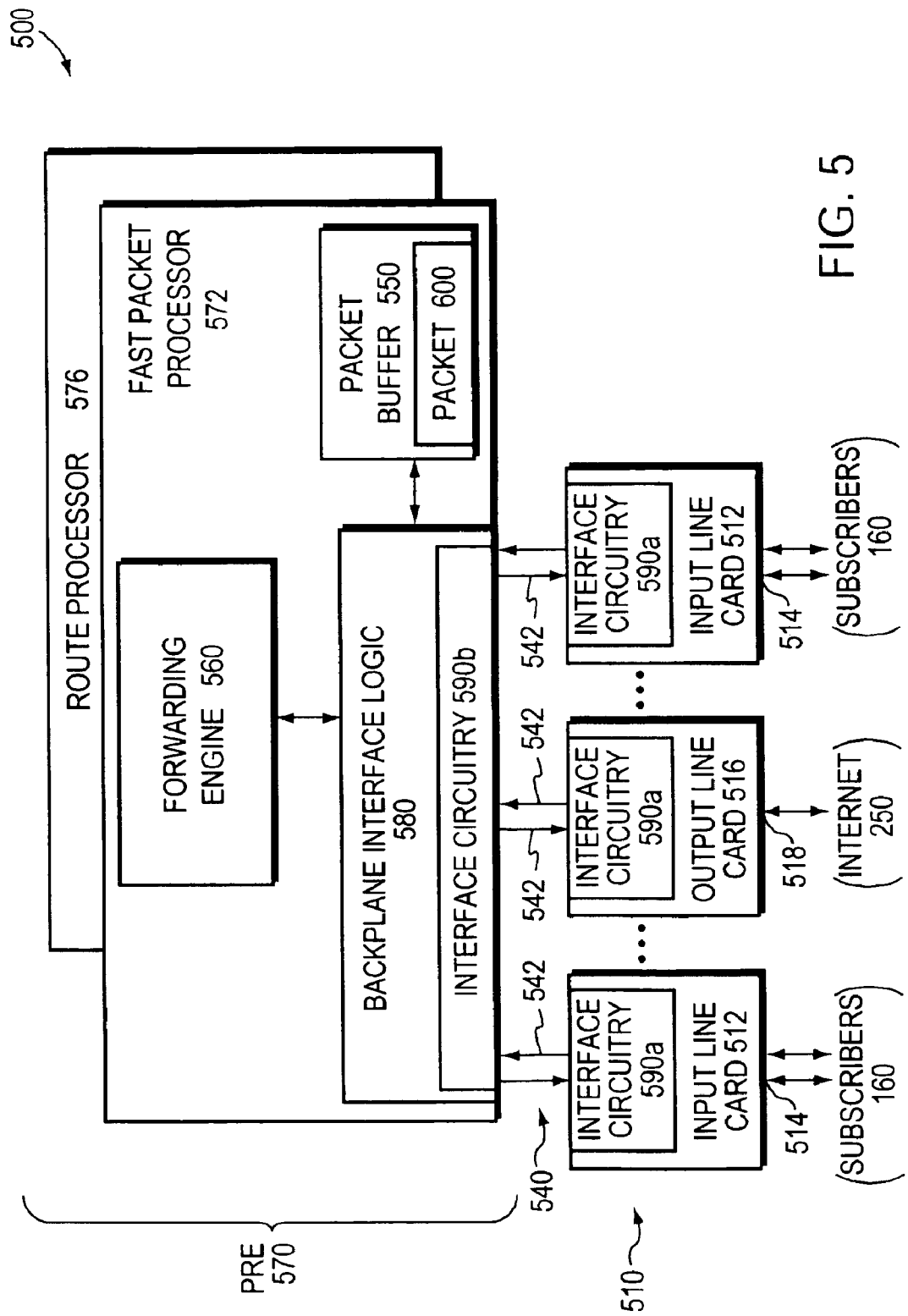
FIG. 5 is a schematic block diagram of an aggregation router in accordance with the present invention.

FIG. 5 is a schematic block diagram of an aggregation router 500 in accordance with the present invention. The aggregation router ("aggregator") comprises a plurality of line cards 510 coupled to at least one performance routing engine (PRE 570) via a unidirectional (i.e., point-to-point) interconnect system 540. The line cards 510 include a plurality of input cards 512 having input ports 514 coupled to subscribers 160 and at least one output "trunk" card 516 configured to aggregate the subscriber inputs over at least one output port 518. The PRE 570 performs packet forwarding and routing operations, along with quality of service (QoS) functions for complete packets received from each input line card over the interconnect system. To that end, the interconnect system 540 comprises a plurality of high-speed unidirectional links 542 coupling the PRE to each line card 510.

Interface circuitry 590 coupled to the ends of the unidirectional links 542 is resident on both the line cards 510 and a backplane logic circuit 580 of the PRE 570. The backplane logic circuit 580 is preferably embodied as a high performance, application specific integrated circuit (ASIC), hereinafter referred to as the Cobalt ASIC, which is configured to further interface the line cards to a packet buffer 550 and a forwarding engine 560 of the PRE. The packet buffer 550 is a memory used to store packets 600 as the forwarding engine 560 determines where and when they should be forwarded within the aggregator. For example, the packet buffer may be used to store low priority data packets while high priority, low latency voice packets are forwarded by the forwarding engine to an output card (e.g., the trunk card 516) of the aggregator. An example of a backplane logic circuit that may be advantageously used with the present invention is disclosed in copending and commonly-owned U.S. patent application Ser. No. 09/791,063 titled High Performance Interface Logic Architecture of an Intermediate Network Node, which application is hereby incorporated by reference as though fully set forth herein.

The unidirectional links 542 facilitate scaling within the aggregator in terms of speed per line card, while also limiting the number of pins needed to interface to the plurality of line cards. In the illustrative embodiment, the unidirectional links are preferably clock forwarded, point-to-point links such that each unidirectional link comprises two data wires for transporting the data signals and one clock wire for carrying clock signals. However, it will be understood to those skilled in the art that the clock forwarding technique may scale to accommodate other clock forwarding arrangements such as, e.g., four data wires for each accompanying clock wire. The aggregator 500 illustratively includes sixteen (16) line cards 510, each of which is configured for an OC-12 (622 Mbps) data rate. Thus, the point-to-point links 542 coupled to the line cards must be capable of supporting such data rates.

Electrical signaling used in the clock forwarding technique preferably incorporates a low voltage differential signaling (LVDS) standard that combines advantages of differential signaling with easy integration into a high-performance ASIC. Differential signaling is typically used to carry fast electrical signals that are highly resistant to electrical noise, permitting lower amplitude voltage swings and tolerating transitions through multiple circuit boards and connectors to thereby minimize electromagnetic interference. Differential reception doubles the effective edge rate while eliminating errors in threshold voltage, such that transition times are fast and predictable.

For example, the clock signals are preferably generated at a frequency of 200 megahertz (MHz) and the data carried over each data wire is sampled at 400 megabits per second (Mbps) to capture the states of the data bits at receiver circuitry coupled to the links. Therefore, the 200 MHz clock signal samples the accompanying data bits at an effective rate of 800 Mbps full duplex per slot, with approximately ⅞ of that bandwidth dedicated to a data path for transporting packet data. That is, the information transferred within the 800 Mbps bandwidth "envelope" comprises 622 Mbps of OC-12 data with the remaining bits allocated for control information, such as framing, flow control, flow and "speed-up" bits. The speed up bits are essentially part of the data path and are used to increase the bandwidth of data so as to enable "draining" of buffers within the router. Preferably, the speed up factor is about 19% which is a sufficient level of margin assuming small buffers on the line cards. Maximum packet bandwidth is thus 711 Mbps full duplex, which is adequate to support one OC-12 link.

In the illustrative embodiment, the interface circuitry 590 of the interconnect system 540 implements a unidirectional, point-to-point clock forwarding technique that is configured for direct ASIC-to-ASIC transmission over a backplane of the aggregation router. To that end, the interface circuitry 590a resident on the line cards 510 is preferably embodied within a high-performance ASIC, hereinafter referred to as the Barium ASIC, whereas the interface circuitry 590b is resident on the Cobalt ASIC. The interface circuitry 590 generally functions as a translator that converts conventional formats of data received at the line cards 510 to a novel protocol format for transmission from, e.g., the Barium ASIC over the interconnect system 540 to the Cobalt ASIC.

According to an aspect of the invention, the novel protocol is directed to a unique encapsulation format of a packet generated by the interface circuitry for transmission over the interconnect system. Broadly stated, each interconnect packet is encapsulated with a 32-bit interconnect header that indicates the length of the packet along with a transmit or receive channel number. The packet itself is carried in the order in which the bytes are received into the aggregation router from a line card. The encapsulation format includes an internal frame check sequence (FCS) appended to the tail of the packet.

Figure 6:
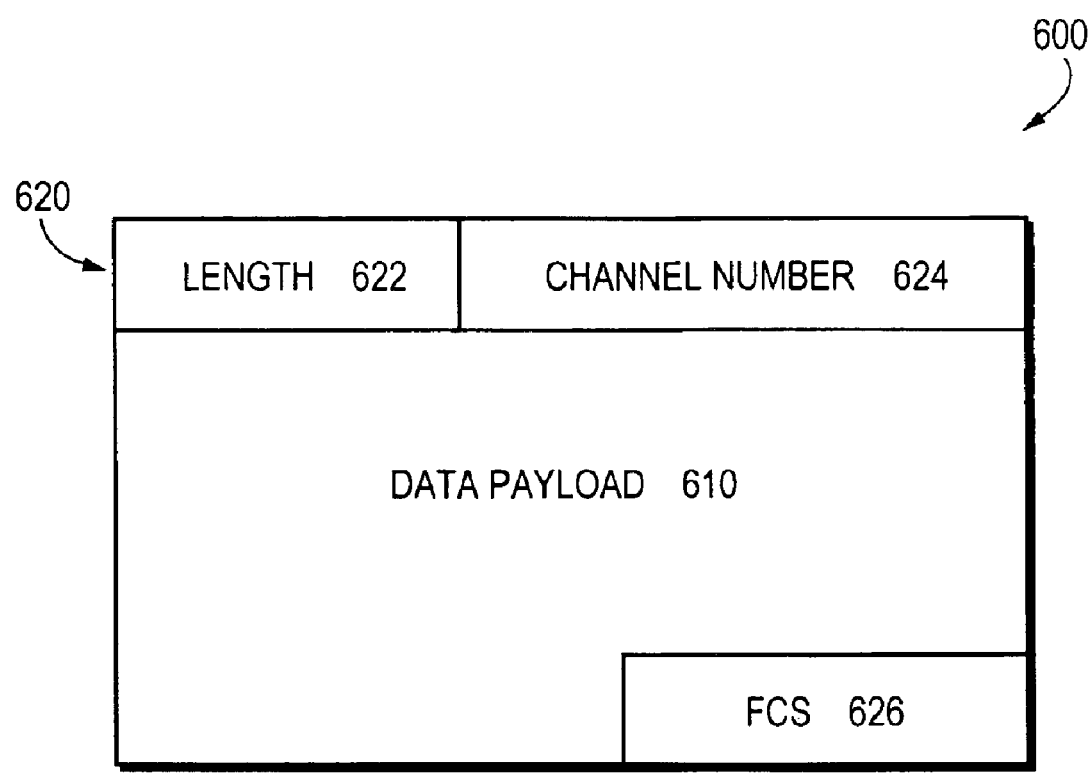
FIG. 6 is a schematic block diagram illustrating the format of a packet including an interconnect header in accordance with the present invention.

FIG. 6 is a schematic block diagram illustrating the format of the interconnect packet 600 that includes a data "payload" portion 610 appended (i.e., attached) to an interconnect header 620, the latter comprising, inter alia, a length field 622 and a channel number field 624. The content of the length field 622 indicates the length (i.e., the number of bytes) of the packet 600 (including the header 620) as it is transmitted over the link. The content of the channel number field 624 is a channel number of a source or destination port for the packet 600. That is, the channel number is preferably an identifier unique to a single packet flow of a line card. An FCS field 626 is appended to the end of the interconnect packet and contains error checking information, such as a cyclic redundancy check (CRC) code, used to verify the integrity of the data.

The channel number field 624 enables a substantial number (e.g., thousands) of different subscribers to efficiently interleave their packet data over a single point-to-point link 542, while allowing receiver circuitry to uniquely identify each packet 600 during a data recovery process. The length field 622 is advantageously used to determine the length, and thus the end, of a packet. Unlike prior systems that utilize end of packet (EOP) indicators to indicate the end of a packet, the novel protocol requires use of only the length field within the interconnect header to determine the end of a packet. Use of the length field to determine the end of a packet is advantageous because EOP indicators tend consume substantial bandwidth and a goal of the novel protocol is to limit the overhead consumed within the interconnect bandwidth. Moreover, the novel encapsulation technique enables a substantial amount of bandwidth to be used for transferring data over a point-to-point link of the interconnect system. For example, ⅞ of the frame bandwidth is available for transferring data, while only ⅛ of the bandwidth is needed for control information directed to, e.g., flow control, flow bits, SOP indicators and error checking.

As described further herein, the interface circuitry, referred to generally at 590, comprises transceiver (i.e., transmitter and receiver) logic for transmitting and receiving information to and from the interconnect system 540 and framing logic for framing and recovering packets within a stream of data bytes. Broadly stated, the interface circuitry 590 may be configured as either an initiator or a target. An initiator interface supplies a clock signal and sets a frame synch phase, whereas a target interface uses the clock and phase transmitted over the interconnect system 540. The target also "loops" the clock signal back to the initiator. The clock signal is used within the receiver to sample the data lines, avoiding the need for clock recovery. Timing is sufficiently robust and the LVDS signaling is sufficiently fast that the data bits may be quickly sampled.

The LVDS transmitter and receiver of the interface circuitry 590 remain powered down (or as quiescent as possible) through reset and remain that way until a ready signal is received from the line card at the other end of the link. This means the interface circuitry only drives and attempts to receive signals over a point-to-point link 542 coupled at each end to a fully powered ASIC. When the ready signal arrives, the interface activates its LVDS circuitry. A supervisory processor (e.g., a microprocessor) on the line card also detects the ready signal, determines any necessary configuration state and loads that state into the (Barium) ASIC, then releases it from reset. The receiver enters a state awaiting the frame/sync pattern to which it "locks" as soon as it is found. The transmitter of an initiator continues to drive its normal signal including the periodic frame sync pattern. A receiver does not present any data to the interior circuitry of the ASIC until frame sync is established. Similarly, a transmitter does not accept data from the interior circuitry of the ASIC until frame sync is established in its partner receiver (on the same ASIC, receiving data from the same full duplex link).

Figure 7:
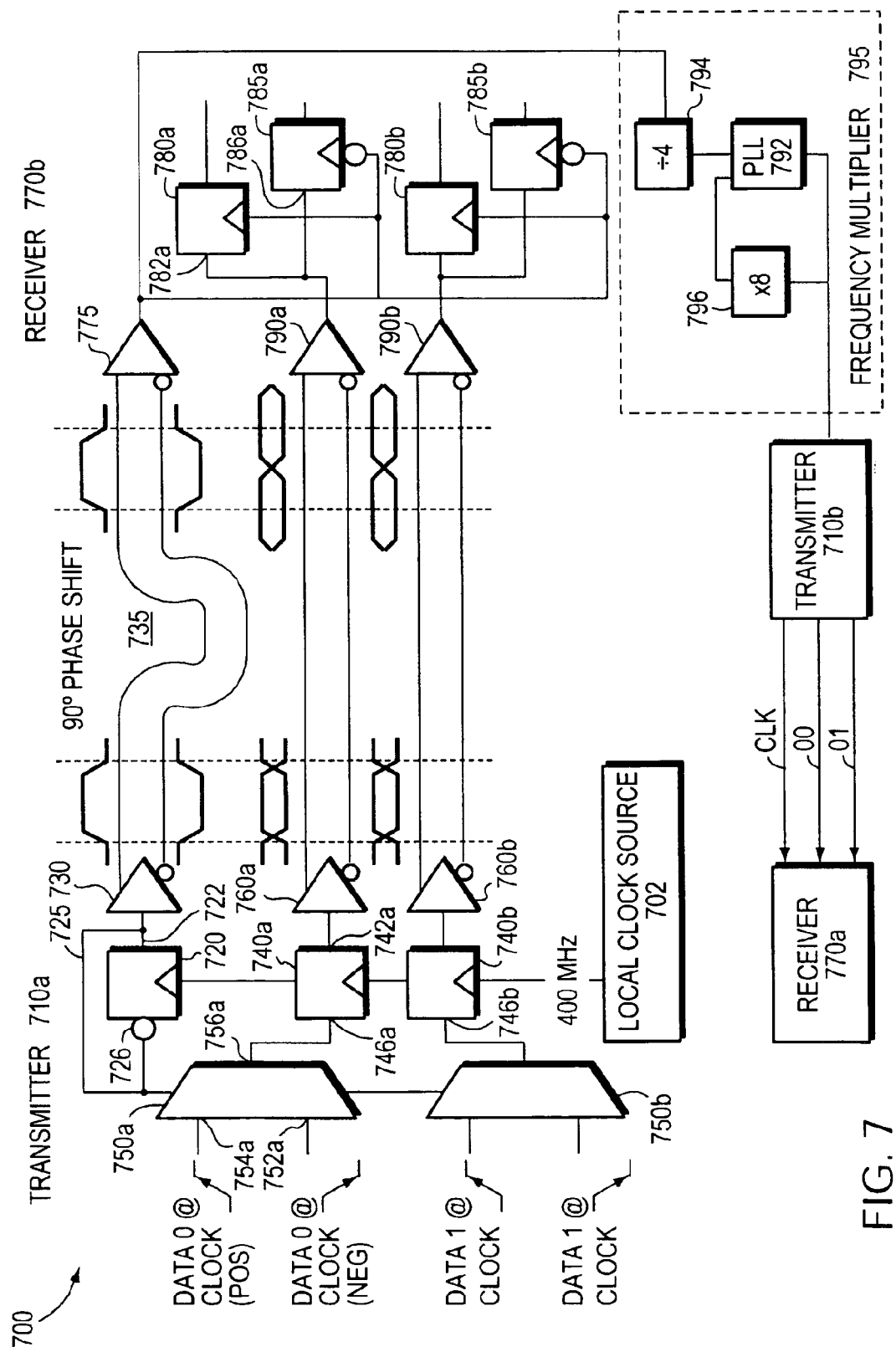
FIG. 7 is a schematic block diagram of transceiver logic embodied within interface circuitry of the present invention.

FIG. 7 is a schematic block diagram of transceiver logic 700 embodied within the interface circuitry 590 of the present invention. A transmitter 710a comprises a plurality of 1-bit registers that are "clocked" (enabled) by a 400 MHz clock signal generated by a local clock source 702. In the illustrative embodiment, the transmitter 710a preferably comprises a "forwarded clock" register 720 configured to generate a forwarded clock signal for transmission over a clock wire of the interconnect system 540. The clock signal forwarded over the link 542 is preferably a 200 MHz clock signal generated by the clock generation logic 720 by, e.g., dividing the 400 MHz enabling clock in half (by 2).

Specifically, an output 722 of the divide-by-2 forwarded clock generator 720 is tied directly to a clock driver 730 and indirectly (via a feedback path 725) to an inverted input 726 of the generator 720. The 200 MHz clock signal is generated by alternating the state of the input (and therefore the output) of the clock generator every cycle of the 400 MHz enabling clock. That is, assume the state of the output 722 of the forwarded clock generator 720 is initially a "0"; the inverted input 726 thus assumes a "1" state. On the next clock edge of the enabling clock, the output 722 of the clock generator assumes a "1" state. Accordingly, the forwarded clock signal produced by the clock driver 730 assumes the clock signal waveform 735.

The transmitter 710a further comprises two data registers 740a,b configured to stage data (D0, D1) prior to transmission over respective data wires accompanying the clock wire. For each data bit accompanying the clock signal, there is a 1-bit data register 740 whose input 746 is coupled to an output 756 of a respective multiplexer 750 that is enabled by the phase of that forwarded clock signal. For example, when the phase of the forwarded clock signal 735 is low, the multiplexer 750a is enabled to select "negative" data D0 at its input 752a and pass that data to the input 746a of its respective data D0 register 740a. On the next edge of the 400 MHz enabling clock, the negative data D0 is driven by a data driver 760a over a corresponding data wire of the interconnect. Likewise, when the forwarded clock signal is asserted "high", the multiplexer 750a is enabled to select its "positive" data D0 input 754a. The positive data is then driven over the corresponding data wire by the driver 760a. The data logic arrangement of the transmitter logic 710a thus drives two different data signals (positive and negative data) over a single data wire of the point-to-point link.

The clock waveform 735 denotes a 90° phase shift that establishes a timing relation between the forwarded clock signal and its accompanying data signals. The timing relation is such that transitions in the data are delayed by 90° with respect to transitions in the accompanying clock signal. The 90° phase shift is needed to ensure that the data and clock signals do not transition at the same time and, thus, do not "confuse" a receiver 770b. In the absence of the phase shift, the data and clock would simultaneously transition because they are both driven off the same 400 MHz enabling clock.

The receiver 770b receives the forwarded clock signal at a clock receiver 775 and feeds a non-inverted copy of the clock signal to a first 1-bit register 780, along with an inverted copy of the received clock to a second 1-bit register 785. Each of these 1-bit registers (e.g., flip-flops) receives its data input from the output of a data receiver 790. For example, received data D0 is latched into the first data (D0) register 780a on the rising edge of the received clock, while data is latched into the second data (D0) register 785a on the falling edge of that clock. Preferably, data should be available on the input 782a, 786a of each receive data register (so that it can become stable) before the clock (edges) arrive at those registers. The 90° phase shift induced into the forwarded clock signal establishes this relationship so that the clock transitions at the time when the data is valid. This ensures delivery of a clear data signal to the data registers 780, 785 of the receiver 770b.

The forwarded clock signal is also provided from clock receiver 775 to a frequency multiplier circuit 795 configured to process the clock signal for use by transmitter 710b of transceiver logic 700 when transmitting data back over the interconnect system to receiver 770a. The frequency multiplier 795 preferably comprises a conventional divide-by-4 circuit 794 configured to divide the 200 MHz clock signal down to 50 MHz. The 50 MHz clock signal is then fed to a conventional phase locked loop (PLL) circuit that conditions (e.g., phase-aligns) the clock signal. The conditioned clock signal is then delivered to a conventional multiply-by-8 circuit 796 that generates a 400 MHz signal for use by the transmitter 710b. It should be noted that the transmitter 710a and receiver 770b are substantially identical in function and structure to transmitter 710b and receiver 770a.

In the illustrative embodiment, there are two bit rows extracted from the data in a unidirectional portion of a point-to-point link: those sampled by the rising edge of the accompanying clock and those sampled by the trailing edge of that forwarded clock. As noted, the data signals are routed with their accompanying clock signal. If diverse paths are used, such as linking a pair of subslots in a backplane of the aggregation router, the clocking and framing of the different groups are handled separately. The paths are linked after framing is complete, at the byte level.

According to the invention, a novel protocol is provided that enables encoding of packets for transmission over the interconnect system of the aggregation router. The interconnect protocol manifests as a unique encoding and encapsulation technique for data transmitted over the point-to-point links. Packets are transmitted, one after another, over the links as a byte stream embedded in time division multiplexing (TDM) framing. Although line cards may process many packets at a time on external interfaces, the interconnect packets are always sent as a contiguous stream of bytes over the links. Flow of the byte stream may be briefly paused by a sync pattern and/or link flow control. During any such pause no packet data is sent; the current packet is thus still contiguous after reception. A FCS pertaining to a particular physical interface is checked by the line card when the interconnect packet is received over external connection. After checking the media-specific FCS, the line card removes the FCS; a packet with a bad FCS is counted and discarded by the line card.

The TDM framing includes information denoting the meaning of the byte stream and a method to control its flow.

The interconnect protocol embeds this information in a "9th bit" column of the frame, multiplexing much of it into a framing bit. To that end, the protocol is directed to framer logic configured to "frame" and recover valid packet data within a stream of data bytes. That is, framers are provided at a transmitter of the interface logic 590 to generate encoded frames from a stream of packet data (bytes) for transmission over the links and at a receiver of the logic 590 to recover the transmitted packet data from the stream.

A frame is a minimum group of bits that is repeated within a framing pattern; it is one cycle of the pattern, carrying a single framing bit. As described further herein, the frame identifies byte boundaries and marks bytes that correspond to start-of-packet (SOP). An encoded frame preferably includes a plurality of SOP indicators (e.g., one every even byte in the packet data path) such that a maximum delay to begin transmitting a packet over a point-to-point link is generally short, e.g., sixteen (16) bits, which substantially reduces latency of packet transmission. The frame is also the window used to find a frame synchronization pattern (i.e., frame sync pattern). The frame corresponds to a hardware clock domain transition, where bytes aligned to a slower ASIC internal clock domain are transposed to bits that are aligned to a synchronous 200 MHz clock domain (or vice versa). The frame consumes a constant amount of time, independent of the number of data signals used.

Figure 8:
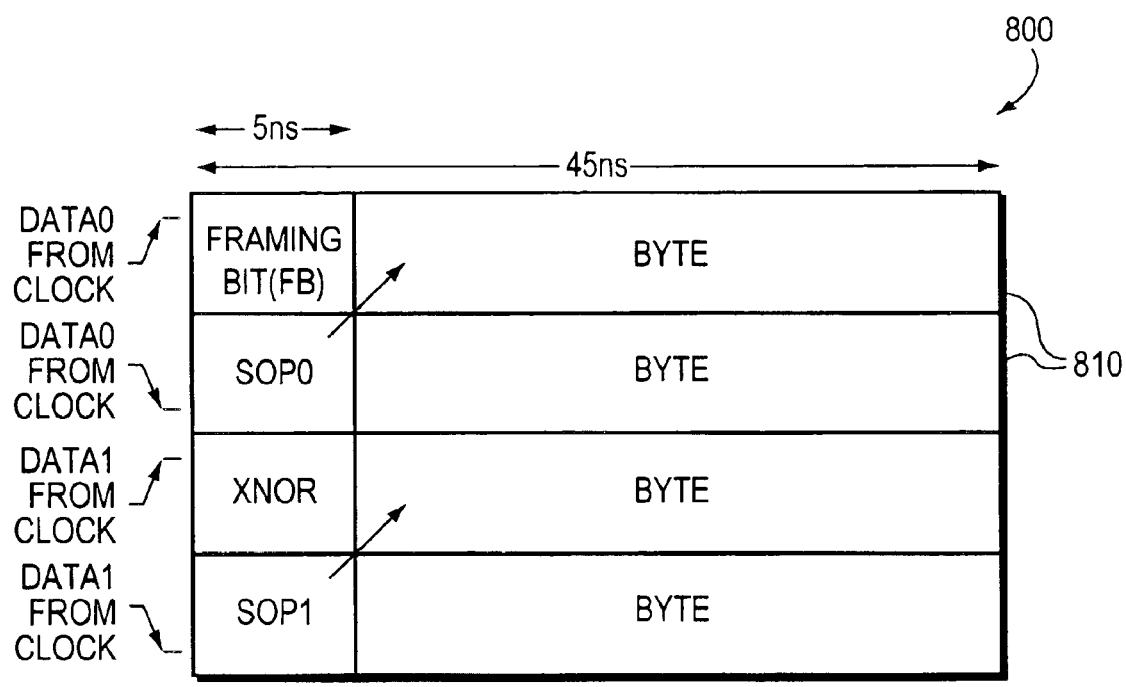
FIG. 8 is a schematic block diagram illustrating the format of a frame in accordance with the present invention.

FIG. 8 is a schematic block diagram illustrating the format of a frame 800. The frame 800 comprises a plurality of rows 810, each having 9 bits of which 8 bits (one byte) comprises packet data and 1 bit (the "9th bit") comprises control information. For each data signal, the 9th bit sampled on the falling edge of a clock signal is a SOP indicator that is asserted if a packet begins on this data signal in the current frame. In the illustrative embodiment, a value "1" indicates a SOP. In response to this indication, the first byte of a packet is recovered from the data sampled by a rising edge of a clock and the second byte is recovered by sampling the data with a falling edge of the clock. The packet continues in the next higher-numbered data signal row of the present frame or continues in the data signal 0 of the next frame. The 9th bit sampled on the rising edge of data zero is called the framing bit (FB) and is used in many ways, depending on the number of the present frame within a frame cycle.

Operationally, a packet is received at a source port 514 of a line card 512 and encapsulated into an interconnect packet 600 having a header 620 (and FCS trailer 626) by the line card. As previously described, the header includes a length field 622 and a channel number field 624. The line card 512 then apportions the encapsulated packet into a plurality of interconnect frames 800 for transmission over the interconnect system 540 to the PRE. Within the frames, the SOP flag references the beginning of a packet and the end of the packet is determined by the content of the length field of the header. The individual frames are transmitted over the interconnect system and reassembled into an interconnect packet 600 at an internal packet memory (IPM) of the Cobalt ASIC. The packet is then transferred to the PRE for processing and, thereafter, the processed packets are forwarded to an output port 518 of a line card 516 and to a destination on the computer network 100.

Figure 9:
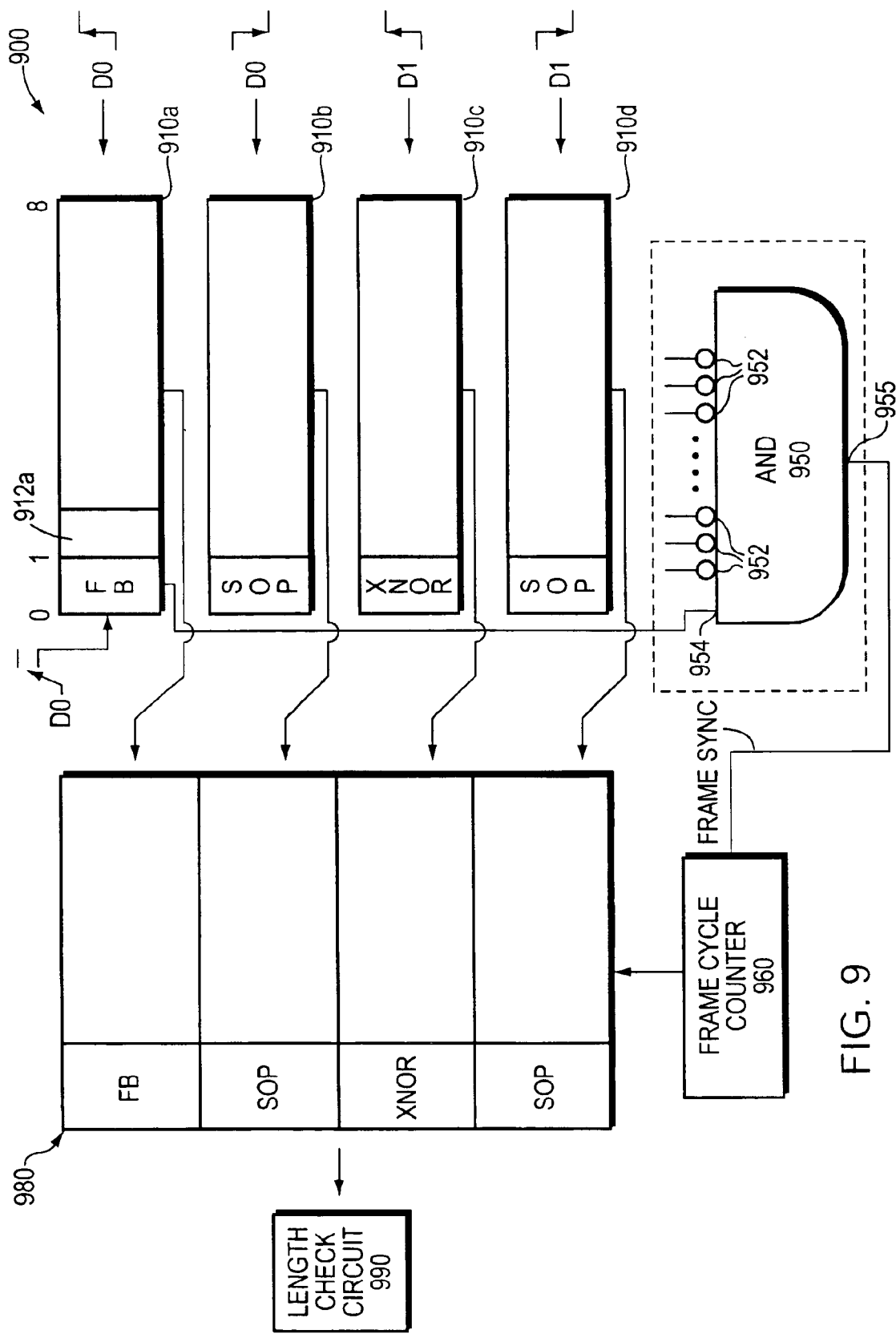
FIG. 9 is a schematic block diagram of an illustrative embodiment of framer logic in accordance with the present invention.

FIG. 9 is a schematic block diagram of an illustrative embodiment of framer logic 900 cooperatively coupled to a receiver (and transmitter) of the interface circuitry 590. The framer 900 comprises a plurality of 9-bit shift registers 910a–d (two for each data line D0, D1) coupled to a circuit 950 configured to search for a framing pattern on every clock tick of the shift registers. If the circuit 950 detects the framing pattern, it triggers activation of a 17-bit frame cycle counter 960. As noted, data D0 rising edge bits are received from a first data register 780a in the receiver 770, while data D0 falling edge bits are received from a second data register 785a of that receiver. A similar arrangement is also used to receive data D1 rising and falling edge bits. These received data bits are fed into four 9-bit shift registers 910 and are accumulated into a pattern of 4×9 bits that are shifted through the registers on every clock tick of the 200 MHz clock signal.

In the illustrative embodiment, the circuit 950 may be implemented as a boolean logic circuit, such as AND gate, configured to receive all thirty-six (36) bits of the shift registers at inputs thereof. In particular, the AND gate 950 has a plurality of inverted inputs 952 such that its output 955 is true (asserted) if all of the inputs 952 are false (not asserted). However, there is one input bit 954, the framing bit, that is not inverted at the input to the AND gate. This arrangement causes circuit 950 to assert if the framing bit is, e.g., "1" and the rest of the frame is "0". This matches the definition of the frame sync pattern. The AND gate 950 functions to assert frame sync at its output 955 when it detects a unique pattern of all zeros except for the framing bit. The assertion of frame sync triggers activation of the counter 960.

The definition of the framing bit is multiplexed by the value of the 17-bit frame. cycle counter 960. The counter 960 is incremented once per frame. Illustratively, a value of all ones wraps to zero, restarting the framing cycle. The framing cycle is therefore $2^{17}$ frames long or 5.89824 milliseconds and is referred to as a superframe. When the frame cycle counter 960 is not all ones, the value of the framing bit is used as a flow bit (or pause flag used for flow control). However, when the frame cycle counter 960 is all ones, the entire frame is redefined to be a frame sync pattern. This pattern exists to allow a receiver to synchronize to its transmitter and is repeated regularly such that no mechanism is needed to track whether the receiver needs to synchronize.

As noted, bits 1–8 of each shift register 910 comprises a byte of data and the four bytes contained in the shift registers collectively comprise packet data within a frame 800. Bits 0 of the shift registers 910a–d are reserved for control information such as SOP, flow control, error checking and similar overhead. For example, when bit 0 of the second shift register 910b is asserted, it indicates a SOP0 that begins at the second (bit 1) position 912a of the first shift register 910a. Bit 0 of the fourth shift register 910d is also a SOP1 indicator or "flag". Moreover, bit 0 of the third shift register 910c is a checking bit (XNOR) that functions as a parity bit to detect a bad frame. The XNOR bit is calculated as, e.g,. !(SOP0 XOR SOP1), and has the properties of (i) checking for data integrity of the link and (ii) ensuring the frame sync pattern can't happen normally (i.e., frame sync violates the XNOR rule).

Each frame 800 represents one "capture" of data bytes received from the data wires of a point-to-point link 542. That is, two data bits at a time are received from a link and loaded into respective 9-bit shift registers 910a–d under control of the accompanying forwarded clock signal until the entire array of shift registers is full. At that time if the shifted frame matches the frame sync pattern, the AND gate 950 is activated to generate frame sync which, in turn, triggers invocation of the counter 960. It should be noted that the circuit 950 "triggers" once per superframe. In response to the frame sync pattern, the counter increments to generate frame numbers for each succeeding frame. The counter is invoked to essentially capture a "snap-shot" of the location of data within a frame register 980, fixing the mapping of bits received to bytes and frames. The frame register 980 captures the data in a stable form of 4 packet data bytes each time the 9-bit shift registers 910 become full. The AND gate 950 and counter 960 are used to trigger loading of the frame register 980 to effectively perform frame alignment. The contents of the frame register essentially enable recovery of data bytes from the received data bits, along with recovery of SOP flags and flow control information.

In the illustrative embodiment, a frame is recovered using the frame recovery technique once every 45 nanoseconds (nsecs). That is, every 45 nsecs a frame 800 is transmitted over a point-to-point link. A data packet can appear at any 16-bit position within a frame as indicated by a SOP flag; thereafter, there may be idle time before another packet begins. Notably, the interconnect protocol can accommodate packets of varying lengths and, thus, a check circuit is provided for checking the length of a packet to insure that it is within an acceptable and supportable range.

Specifically, a next level of data recovery involves recovering interconnect packets from frames. Packets are delineated by the SOP indicator of the frame and a length field of the interconnect header; notably, no EOP indicator is required. To that end, a length check circuit 990 is provided to determine the end of a packet by examining the header 620 and, in particular, the content of the length field 622. When an interconnect packet is found, the length check circuit 990 forwards the packet to the core of the ASIC. Before the packet is forwarded, the circuit 990 further examines the contents of the length field 622 and channel number field 624. The circuit 990 comprises conventional logic circuitry organized to examine the content of the length field 622 and compare that content with minimum and maximum values to determine whether the packet length is of a supportable size. If the packet length is unsupportable, the packet is discarded. The circuit 990 then determines the destination of the packet by examining the content of the channel number field 622. As noted, the channel number uniquely identifies a subscriber (port) of a line card and, in this context, the destination of the packet. Each channel has its own buffering and associated flow bits for communication with the forwarding engine 560.

The length check circuit 990 generally performs minimal checking to determine whether it is safe to send the packet to the interior circuitry of the ASIC and whether the packet is of an acceptable size. Only minimal checking is performed primarily because the check circuitry 990 must be small to accommodate the limited space available within, e.g., the interface circuitry 590 of the ASIC. Specifically, the intent of the check circuitry is to ensure that the internal ASIC hardware does not get "stuck" because of bad packet data. The recovered "good" data packets are then passed to, in the case of the Cobalt ASIC, the IPM.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for encoding packet data for transmission over an interconnect system used to couple a plurality of line cards to a routing engine of an intermediate network node, the method comprising the steps of:

generating an interconnect packet from the packet data received at a line card, the interconnect packet including a data payload appended to a header, the header comprising a length field and a channel field;

encoding frames from a stream of interconnect packets for transmission over the interconnect system, each encoded frame including a plurality of start of packet (SOP) indicators arranged to substantially reduce latency associated with transmission of the interconnect packets;

recovering the encoded frames and stream of interconnect packets from the interconnect system; and determining an end of each interconnect packet within the recovered stream using a length content of the length field.

2. The method of claim 1 wherein the step of encoding comprises the step of apportioning each interconnect packet into a plurality of encoded frames.

3. The method of claim 2 wherein the step of recovering comprises the step of reassembling the encoded frames into an interconnect packet.

4. The method of claim 3 wherein the step of recovering further comprises the step of referencing a beginning of each interconnect packet using the SOP indicators.

5. The method of claim 1 wherein the step of determining comprises the step of checking the length content to insure it is within a supportable range.

6. The method of claim 1 wherein the step of determining comprises the step of comparing the length content with minimum and maximum values to determine whether the interconnect packet has a length of supportable size.

7. The method of claim 6 further comprising the step of, if the length is of a supportable size, examining a channel number content of the channel field to determine a destination of the interconnect packet.

8. A method for encoding packet data for transmission over an interconnect system used to couple a plurality of line cards to a routing engine of an intermediate network node, the method comprising the steps of:

generating an interconnect packet from the packet data received at a line card, the interconnect packet including a data payload appended to a header, the header comprising a length field and a channel field;

encoding frames from a stream of interconnect packets for transmission over the interconnect system, each encoded frame including a plurality of start of packet (SOP) indicators arranged to substantially reduce latency associated with transmission of the interconnect packets;

determining an end of each interconnect packet within the recovered stream using a length content of the length field;

recovering the encoded frames and stream of interconnect packets from the interconnect system;

comparing the length content with minimum and maximum values to determine whether the interconnect packet has a length of supportable size; and discarding the interconnect packet if the length is of an unsupportable size.

9. A system for encoding packet data for transmission over an interconnect system used to couple a plurality of line cards to a routing engine of an intermediate network node, the system comprising:

interface circuitry of the routing engine and each line card, the interface circuitry adapted to generate an interconnect packet from the packet data initially received at the line card, the interconnect packet including a data payload appended to a header, the header comprising a length field and a channel field;

means, coupled to the interface circuitry, for (i) encoding frames from a stream of interconnect packets for transmission over the interconnect system and (ii) recovering the encoded frames and stream of interconnect packets from the interconnect system, each encoded frame including a plurality of start of packet (SOP) indicators arranged to substantially reduce latency associated with transmission of the interconnect packets; and a length check circuit coupled to the interface circuitry and configured to determine an end of each interconnect packet within the recovered stream using a length content of the length field.

10. The system of claim 9 wherein the interface circuitry functions as a translator that converts a packet data format received at the line card to a protocol format of the interconnect packet.

11. The system of claim 9 wherein the means for encoding comprises a transmitter cooperatively coupled to framing logic and adapted to transmit the encoded frames over the interconnect system.

12. The system of claim 11 wherein the transmitter comprises:

a forwarded clock register configured to generate a forwarded clock signal for transmission over a clock wire of the interconnect system;

a plurality of data registers configured to stage data prior to transmission over respective data wires of the interconnect system; and a clock source configured to generate a local clock signal used to enable the forwarded clock and data registers.

13. The system of claim 9 wherein the means for recovering comprises a receiver cooperatively coupled to framing logic and adapted to receive the encoded frames and stream of interconnect packets from the interconnect system.

14. The system of claim 9 wherein the length check circuit comprises logic circuitry organized to compare the length content with minimum and maximum values to determine whether a length of the packet is of a supportable size.

15. The system of claim 9 wherein the intermediate network node is an aggregation router.

16. The system of claim 15 wherein the routing engine is a performance routing engine of the aggregation router.

17. A system for encoding packet data for transmission over an interconnect system used to couple a plurality of line cards to a routing engine of an intermediate network node, the system comprising:

interface circuitry of the routing engine and each line card, the interface circuitry adapted to generate an interconnect packet from the packet data initially received at the line card, the interconnect packet including a data payload appended to a header, the header comprising a length field and a channel field;

means, coupled to the interface circuitry, for (i) encoding frames from a stream of interconnect packets for transmission over the interconnect system and (ii) recovering the encoded frames and stream of interconnect packets from the interconnect system, each encoded frame including a plurality of start of packet (SOP) indicators arranged to substantially reduce latency associated with transmission of the interconnect packets;

a length check circuit coupled to the interface circuitry and configured to determine an end of each interconnect packet within the recovered stream using a length content of the length field;

a receiver cooperatively coupled to framing logic and adapted to receive the encoded frames and stream of interconnect packets from the interconnect system;

the receiver has, first and second data registers configured to receive data from respective data wires of the interconnect system; and a clock receiver for receiving a forwarded clock signal from a clock wire of the interconnect system, the clock receiver configured to feed a non-inverted copy of the received clock signal to the first data register and an inverted copy of the received clock signal to the second data register.

18. The system of claim 17 wherein the framing logic comprises a plurality of shift registers adapted to store the receive data provided by the first and second data registers.

19. The system of claim 18 wherein each encoded frame comprises a group of bits that is repeated within a framing pattern and wherein the framing logic further comprises a boolean logic circuit coupled to the shift registers, the boolean logic circuit configured to search for the framing pattern.

20. The system of claim 19 wherein the framing logic further comprises a frame cycle counter that is activated in response to detection of the framing pattern.

21. Apparatus adapted to process packet data for transmission over an interconnect system used to couple a plurality of line cards to a muting engine of an intermediate network node, the system comprising:

interface circuitry of the routing engine and each line card, the interface circuitry adapted to generate an interconnect packet from the packet data initially received at the line card, the interconnect packet including a data payload appended to a header, the header comprising a length field and a channel field;

framing logic cooperatively coupled to (i) a transmitter to encode frames from a stream of interconnect packets for transmission over the interconnect system and (ii) a receiver to recover the encoded frames and stream of interconnect packets from the interconnect system, each encoded frame including a plurality of start of packet (SOP) indicators arranged to substantially reduce latency associated with transmission of the interconnect packets; and a length check circuit coupled to the interface circuitry and configured to determine an end of each interconnect packet within the recovered stream using a length content of the length field.

22. A method for encoding packet data for transmission over an interconnect system used to couple a plurality of line cards in a network device, comprising:

generating an interconnect packet from the packet data received at a line card, the interconnect packet including a data payload appended to a header;

encoding frames from a stream of interconnect packets for transmission over the interconnect system, each encoded frame including a plurality of start of packet (SOP) indicators;

recovering the encoded frames and stream of interconnect packets from the interconnect system; and determining an end of each interconnect packet within the recovered stream using a length content of a length field in the header.

23. The method as in claim 22, further comprising:

using 8 bits to represent a byte of the packet data and using a 9 th bit for the SOP.

24. A network device, the network device having a plurality of line cards coupled by an interconnect, comprising:

means for generating an interconnect packet from the packet data received at a line card, the interconnect packet including a data payload appended to a header;

means for encoding frames from a stream of interconnect packets for transmission over the interconnect system, each encoded frame including a plurality of start of packet (SOP) indicators;

means for recovering the encoded frames and stream of interconnect packets from the interconnect system; and means for determining an end of each interconnect packet within the recovered stream using a length content of a length field in the header.

25. The network device as in claim 24, further comprising:

means for using 8 bits to represent a byte of the packet data and using a 9 th bit associated with each byte for the SOP.

26. A network device, comprising:

a plurality of line cards coupled by an interconnect;

interface circuitry to generate an interconnect packet from the packet data received at a line card of the line cards, the interconnect packet including a data payload appended to a header;

sending transceiver logic to encode frames from a stream of interconnect packets for transmission over the interconnect system, each encoded frame including a plurality of start of packet (SOP) indicators;

receiving transceiver logic to recover the encoded frames and stream of interconnect packets from the interconnect system; and length determining circuitry to determine an end of each interconnect packet within the recovered stream using a length content of a length field in the header.

27. The network device as in claim 26, further comprising:

a frame having 8 bits to represent a byte of the packet data and using a 9 th bit for the SOP.

* * * * *